United States Patent
Kulkarni et al.

(10) Patent No.: US 12,293,204 B2
(45) Date of Patent: May 6, 2025

(54) COLLECTING DIAGNOSTIC INFORMATION FROM A FAILED CONTAINER

(71) Applicant: Dell Products, L.P., Hopkinton, MA (US)

(72) Inventors: Shefali Kulkarni, S Kodagu (IN); Vimal Krishna, Bangalore (IN); Amit Kumar Karira, Bangalore (IN)

(73) Assignee: Dell Products, L.P., Hopkinton, MA (US)

( * ) Notice: Subject to any disclaimer, the term of this patent is extended or adjusted under 35 U.S.C. 154(b) by 486 days.

(21) Appl. No.: 17/958,400

(22) Filed: Oct. 2, 2022

(65) Prior Publication Data

US 2024/0111557 A1  Apr. 4, 2024

(51) Int. Cl.
*G06F 9/455* (2018.01)
*G06F 9/4401* (2018.01)

(52) U.S. Cl.
CPC ........ *G06F 9/45545* (2013.01); *G06F 9/4406* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 9,804,952 | B1* | 10/2017 | Cohen | G06F 11/366 |
| 10,776,091 | B1* | 9/2020 | Wagner | G06F 9/45558 |
| 2014/0149998 | A1* | 5/2014 | Kumar | G06F 9/542 |
| | | | | 719/329 |
| 2018/0173502 | A1* | 6/2018 | Biskup | G06F 21/56 |
| 2019/0312800 | A1* | 10/2019 | Schibler | H04L 63/1433 |
| 2020/0117434 | A1* | 4/2020 | Biskup | G06F 9/445 |
| 2020/0327006 | A1* | 10/2020 | Khanna | G06F 11/1438 |
| 2022/0171648 | A1* | 6/2022 | Rodriguez | G06F 9/45533 |

* cited by examiner

*Primary Examiner* — Adam Lee
(74) *Attorney, Agent, or Firm* — Anderson Gorecki LLP (57) ABSTRACT

A diagnostics collection script is included in a container image. When an original instance of the container fails, a new instance of the container is started using the container image using a Docker compose YAML file having the diagnostics collection script as an entrypoint. The diagnostics collection script is configured to collect the logs of the original (now failed) container during the container start operation. In this manner, the container is able to be started in a safe mode and is isolated to only run the diagnostics collection script without disturbing the container's original settings. By recreating the exact environment of the failed container, and running diagnostics on the environment, it is possible to obtain the log files from the original container as well as to implement diagnostic operations on the environment of the original container, which can then be used to help diagnose why the original container failed.

20 Claims, 6 Drawing Sheets

COLLECTING DIAGNOSTIC INFORMATION FROM A FAILED CONTAINER

FIELD

This disclosure relates to computing systems and related devices and methods, and, more particularly, to a method and apparatus for collecting diagnostic information from a failed container.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

Containers, such as Docker containers, are portable and standalone application software. Containers are deployed on a host Operating System (OS) and continue to run on these hosts. If a user wants to send a command to the container, the user can execute the command from the host. Unlike Virtual Machines, containers do not require separate Operating Systems. Multiple containers can be hosted on a single OS. Although some embodiments will be described in which the containers are implemented using Docker containers, it should be understood that other forms of containers can be used as well depending on the implementation.

When a Docker container is corrupted for any reason, that is, the Docker container has reached a 'failed' or 'unresponsive' state it is sometimes advantageous to determine why the Docker container failed. Diagnostics of this nature might be useful, for example, to determine if there is a flaw in the software contained in the container that might need to be fixed. However, when a Docker container has reached a failed or unresponsive state, it becomes unreachable from the host, and without the diagnostics, it becomes almost impossible to diagnose why the container failed.

In some instances, to determine why a particular container failed, it is necessary to collect diagnostics from the containers that are dependent on the exact environment that existed at the time the container failed. Example diagnostics might include, for example network statistics, device statistics, logs during the time the container failed etc. These logs and diagnostics need to be fetched from inside the container in real-time after the container already exited (is in an unresponsive state). Unfortunately, given the fact that the container is unresponsive, regular methods of collecting the logs and diagnostics that rely on interacting with the container cannot be used.

According to some embodiments, It is possible to fetch diagnostics associated with a failed container by implementing an interface within the container that (1) creates a wrapper around the container-specific diagnostic collection binaries; and (2) creates the exact environment in which the diagnostics need to be collected.

In some embodiments, an executable script is placed inside the container before failure of the container, for example in connection with building the container. Then, when the container fails, the container is started on the host using a new Docker compose YAML file using this script as an 'entrypoint' to collect the logs during the container start operation. In this manner, the container is able to be started in a safe mode and is isolated to only run the diagnostics collection script without disturbing the container's original settings. By recreating the exact environment of the failed container, and running diagnostics on the environment, it is possible to obtain the log files from the container as well as generate other logs based on diagnostic operations that are executed on the environment of the original container, to help diagnose why the original container failed.

In this context, a YAML file is a configuration file that can be used to configure a Docker container. The 'entrypoint' tells the Docker engine how to start a given container, that is, a script that is executed when the Docker is started on the host. This can be defined in the YAML file. The "Docker container" includes a set of Docker volumes, that are mounted within the container and this location can be accessible from the host as well by mapping it to the host. The mapping can be done using the same YAML file.

According to some embodiments, a script is added inside the Docker container that is given executable permission and will serve as an interface to the host from container. When the script is executed, the script creates a wrapper around the container-specific diagnostic collection binaries and creates the exact environment in which the diagnostics need to be collected. Example script includes logic for collection of network statistics, device statistics, archiving logs etc., and provides details of the Docker volume where the archive of information collected by the script needs to be placed at after collection.

According to some embodiments, when a container has entered a failed state, a Docker volume on the host is mounted and is mapped to the host. A Docker compose YAML file with the entrypoint as the script is used, with an absolute path, to cause the script to execute within the Docker container. The script executes to collect the information the script has been designed to collect, such as log files etc. that are stored in the Docker volume. Once the script has executed, the Docker container exits again after log collection is successful, since the daemons (process running continuously and keeps the container alive) are not running. Once the Docker container has exited, the logs are able to be fetched from the mountpoint on the host and are available to be used to determine the cause of the original container failure.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
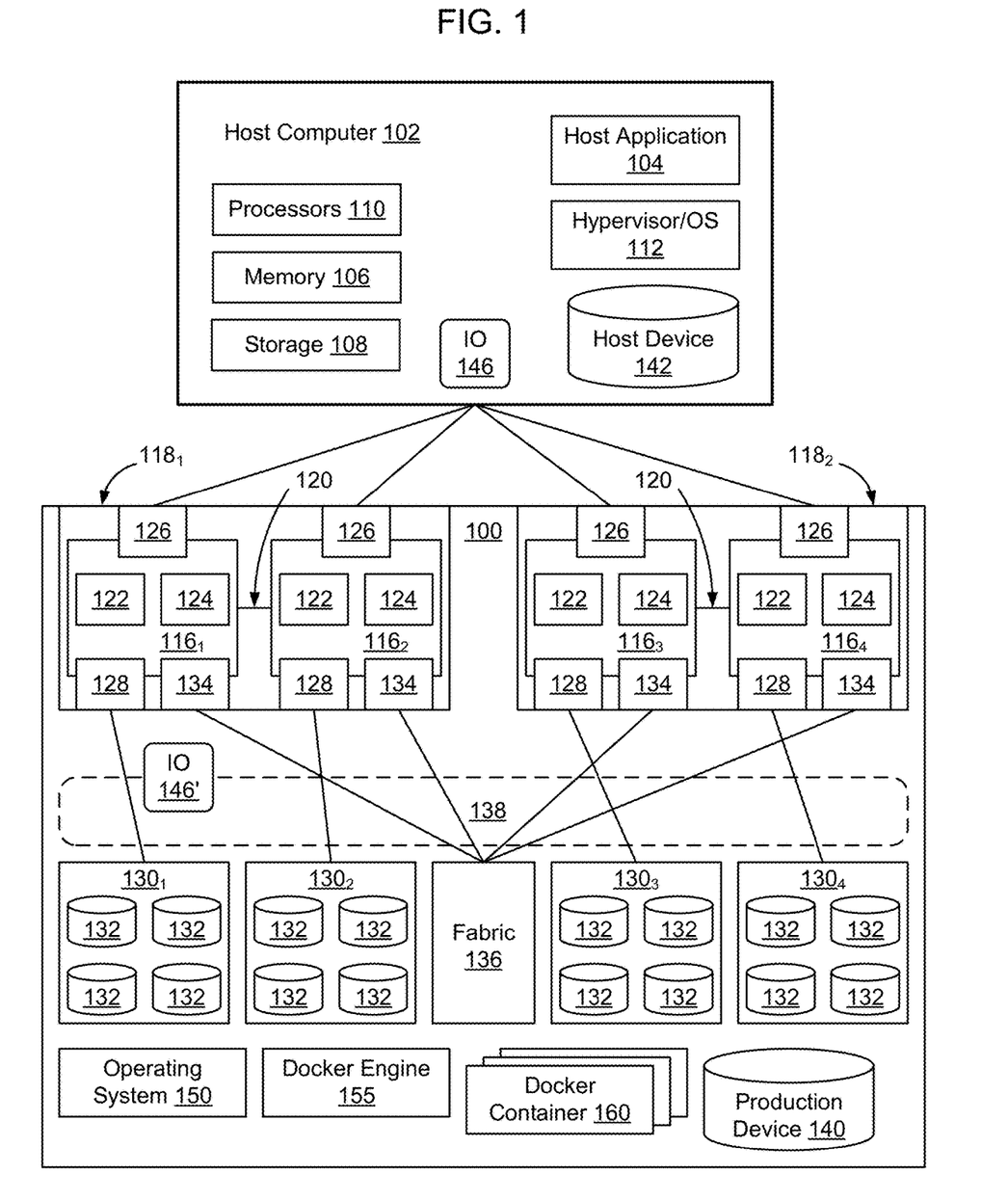
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g., via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device

140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

As shown in FIG. 1, in some embodiments the storage system 100 includes a container engine 155, an example of which is a Docker engine. The container engine 155 supports creation of containers 160. As used herein, the term "container" is used to refer to a discrete environment set up within an operating system in which one or more applications may be run. A container includes the software, libraries, and set of configuration files to enable the software to execute in the context of the operating system. Containers are packages of software that contain all of the necessary elements to run in any environment. Containers thus enable applications to run in self-contained environments on a host computer. Example containers include Docker containers, although other types of containers may be used as well depending on the implementation. Although some embodiments will be described herein in which the containers that are created are Docker containers, it should be understood that other forms of containers may be used as well, depending on the implementation. For example, Kubernates (K8s) provides an open-source container orchestration system for automating software deployment, scaling, and management and may be used, in some embodiments, instead of the Docker containers described in greater detail herein.

Figure 2:
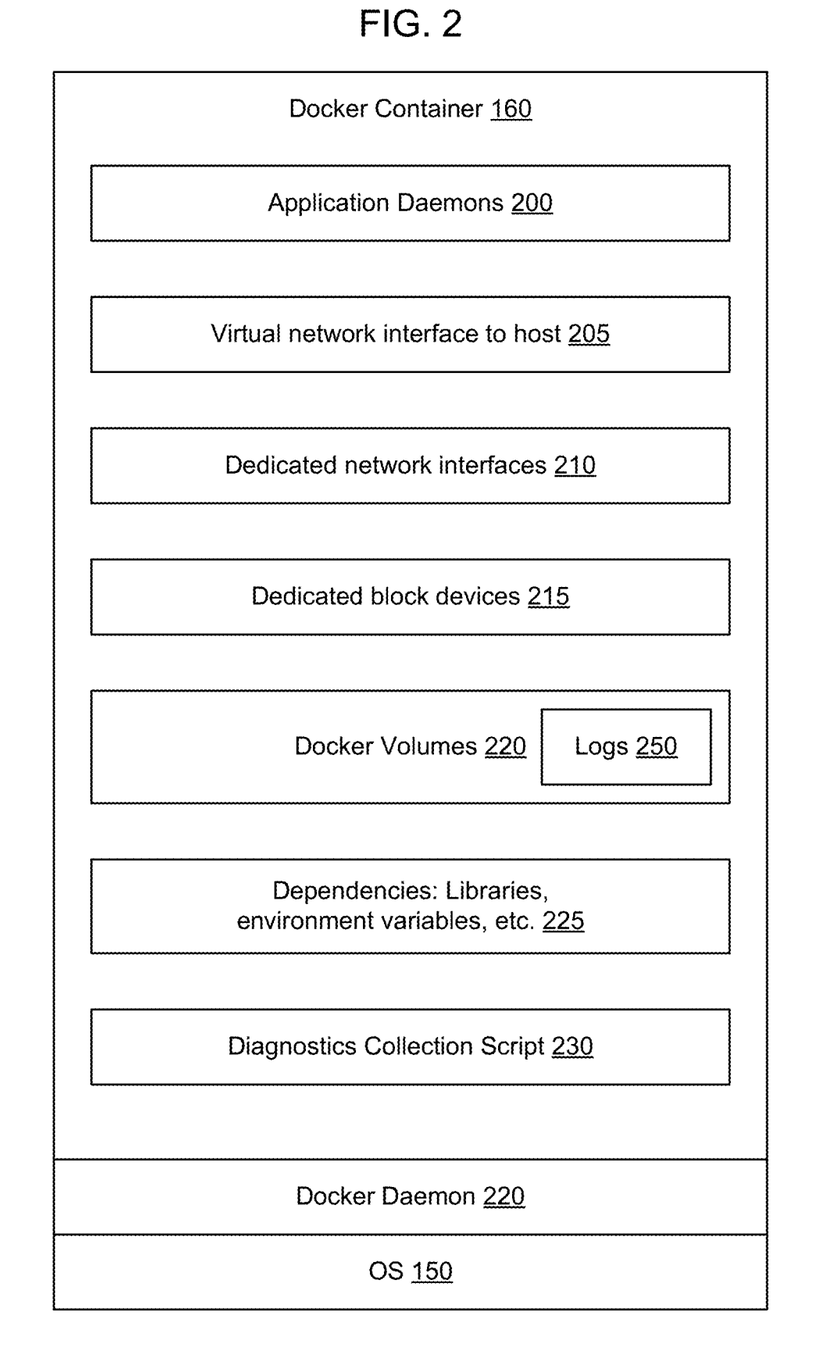
FIG. 2 is a functional block diagram of an example container, according to some embodiments.

FIG. 2 is a functional block diagram of an example container 160, according to some embodiments. As shown in FIG. 2, unlike a virtual machine, a container does not have its own operating system but rather runs on top of the host operating system 150. A Docker daemon 220 (persistent process) executes on the operating system 150 to enable the Docker container to be implemented on the operating system 150.

The Docker container 160 contains application code which, when executing, are implemented using application daemons 220. The Docker container 160 also includes one or more virtual network interfaces to the host 205 and may include one or more dedicated network interfaces 210. If a Docker container fails, the container environment, which includes the virtual host interfaces and dedicated network interfaces, will need to be replicated to enable diagnostics to be run on these interfaces to determine if the interfaces are operational.

The Docker container 160 may also include one or more dedicated block devices 215 and one or more Docker volumes 220. Log files 250 describing execution of operations by the application daemons and transactions on the interfaces 205, 210 may be stored on the block devices or on one or more of the Docker volumes 220, depending on the implementation. The Docker container also includes any dependencies 225 required by the application daemons to enable the application to execute within the Docker container. Example dependencies include libraries, environment variables, and other items depending on the implementation.

In some embodiments, as shown in FIG. 2, an executable diagnostics collection script 230 is placed inside the container before failure of the container, for example in connection with building the container. Then, when the container fails, the container is started on the host using a new Docker compose YAML file using the diagnostics collection script 230 as an 'entrypoint' to collect the logs during the container start operation. In this manner, the container 160 is able to be started in a safe mode and is isolated to only run the diagnostics collection script 230 without disturbing the container's original settings. By recreating the exact environment of the failed container, and running diagnostics on the environment created in the container started using the diagnostics collection script 230 as the entrypoint, it is possible to obtain the log files from the original container as well as generate other logs based on diagnostic operations that are executed by the diagnostic collection script 230 on the environment of the original container, to help diagnose why the original container failed.

In this context, a YAML file is a configuration file that can be used to configure a Docker container. The 'entrypoint' tells the Docker engine how to start a given container, that is, to specify that the diagnostics collection script should be executed when the Docker is started on the host. This can be defined in the YAML file. The "Docker container" includes a set of Docker volumes 220, that are mounted within the container and this location can be accessible from the host as well by mapping it to the host. The mapping can be done using the same YAML file.

According to some embodiments, a script 230 is added inside the Docker container 160 that is given executable permission and will serve as an interface to the container from the host. When the script 230 is executed, the script 230 creates a wrapper around the container-specific diagnostic collection binaries and creates the exact environment of the original container in which the diagnostics need to be collected. Example script 230 includes logic for collection of network statistics, device statistics, archiving logs 250 etc., and provides details of the Docker volume 220 where the archive of information collected by the script needs to be placed after collection.

According to some embodiments, when a container 160 has entered a failed state, a Docker volume 220 on the host is mounted and is mapped to the host. A Docker compose YAML file with the entrypoint as the script 230 is used, with an absolute path, to cause the script to execute within the Docker container 160. The script executes to collect the information the script has been designed to collect, such as log files etc. that are stored in the Docker volume 220. Once the script 230 has executed, the Docker container 160 exits again after log collection is successful, since the daemons (process running continuously and keeps the container alive) are not running. Once the Docker container 160 has exited, the logs 250 are able to be fetched from the mountpoint on the host and are available to be used to determine the cause of the original container failure.

Figure 3:
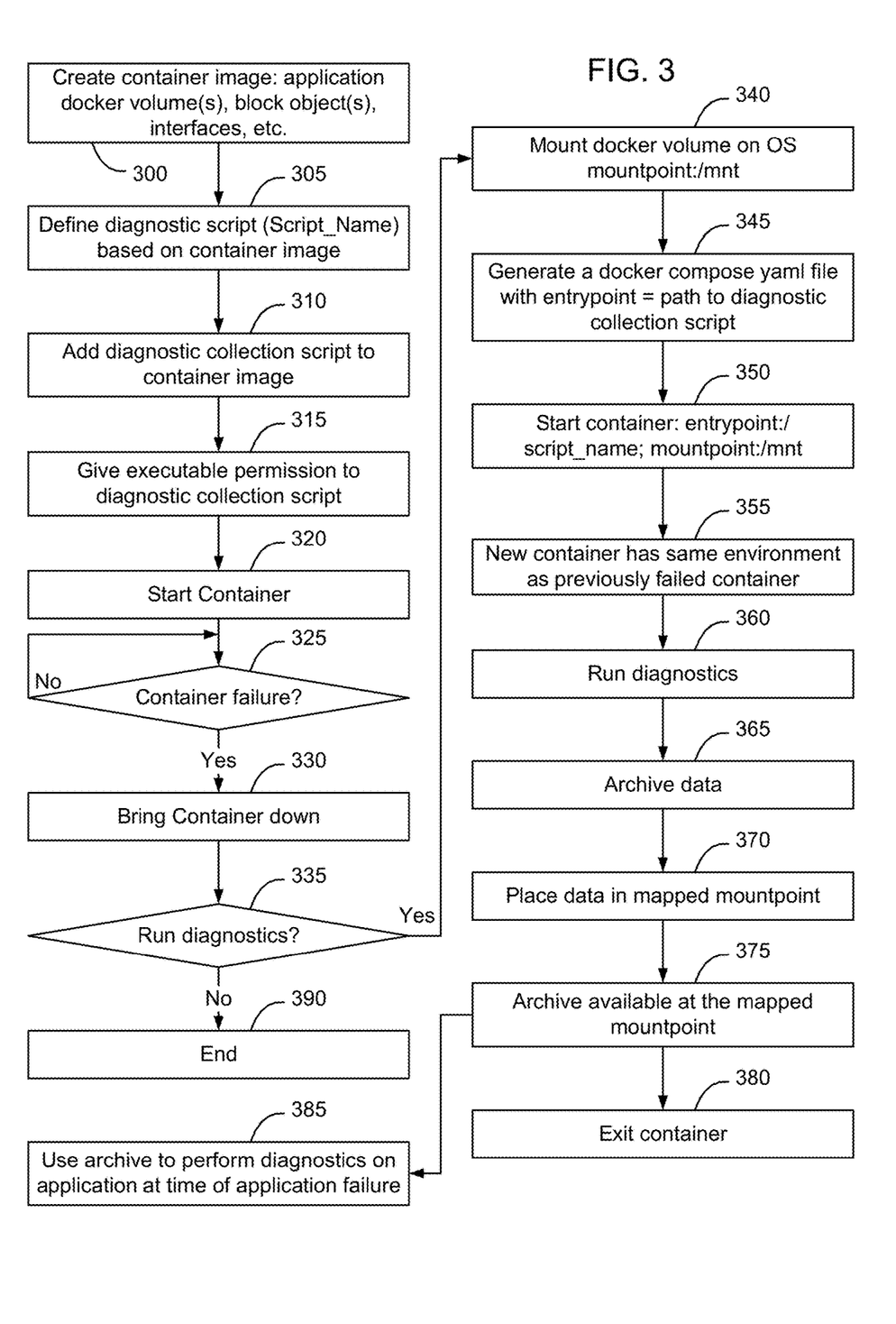
FIG. 3 is a flow chart of an example process of collecting diagnostic information from a failed container, according to some embodiments.

FIG. 3 is a flow chart of an example process of collecting diagnostic information from a failed container, according to some embodiments. As shown in FIG. 3, in some embodiments a Docker image is created (block 300) that includes one or more applications that should execute in the container 160. A Docker container image is a lightweight, standalone, executable package of software that includes everything needed to run an application: code, runtime, system tools, system libraries and settings. Container images become containers at runtime. In the case of Docker containers, Docker images become containers when they run on the Docker Engine 155.

The Docker image also defines the environment of the Docker container in which the applications should execute, such as the set of Docker volumes 220, block objects 215, virtual network interfaces to the host 205, dedicated network interfaces 210, etc. that should be used by the container. The set of Docker volumes 220, block objects 215, virtual network interfaces to the host 205, and dedicated network interfaces 210, are referred to herein as the "environment" of the original docker container.

In addition to creating the Docker image, a diagnostic collection script 230 is defined based on the container image (block 305). As discussed in greater detail herein, during runtime the application will create log files that are stored in one or more of the Docker volumes, as specified in the Docker image. If the container fails, a new Docker container can be started using the same Docker image, but using the diagnostic collection script as the entry point to the Docker container. The Docker collection script is configured to collect the log files that were stored on the Docker volume and make the log files available on a mountpoint on the host. Accordingly, in some embodiments the Docker collection script is defined based on the configuration of the Docker image, e.g. based on the collection of Docker volumes or other constructs used to store the logs 250.

Additionally, in some embodiments the diagnostic collection script 230 is configured to create the same environment as the original (now failed) container, and run diagnostic operations on the environment of the Docker container, as specified in the Docker image. As discussed in greater detail herein, the Docker image defines the environment of the Docker container such as the virtual network interface to the host 205 that is to be used by the Docker container and the network interfaces 210 that the application is to use when running in the Docker container. If the Docker container fails, a new Docker container can be started using the same Docker image, but using the diagnostic collection script as the entry point to the Docker container. By using the same Docker image, the new container will have the same environment as the original (now failed) container. Specifically, the environment of the new Docker container will include the same virtual network interface to the host 205 and the same set of network interfaces 210. This enables diagnostic operations to be implemented by the diagnostic collection script 230, such as to implement network diagnostics on the interfaces in the environment. The results of the diagnostic operations may be stored along with the log files, for example by making the diagnostics available on a mountpoint on the host.

Since the particular log files that are to be collected by the diagnostic collection script 230, and the particular diagnostic operations that are to be taken by the diagnostic collection script 230 are specific to the container image, in some embodiments the diagnostic collection script 230 is defined, at least in part, based on the container image (block 305). The diagnostic collection script 230 is assigned a name and is added to the Docker container image (block 310). The diagnostic collection script 230 is given executable permission (block 315) to enable the diagnostic collection script to execute in the context of the container once the container image has been used to create a container by the Docker engine 155.

Once the Docker image is created, and the diagnostics collection script 230 has been added to the Docker image, the Docker image is used to start a container (block 320). For example, the following Docker command may be used to start the container:

$ docker run [OPTIONS] image.

Once the container has started, a determination is made as to whether the container has failed (block 325). While the container has not failed (a determination of NO at block 325), log files and diagnostics may be collected from the container by issuing commands to the container. An example process of collecting log files and diagnostics from an executing container is described in greater detail in connection with FIG. 4.

If the container is determined to have failed (a determination of YES at block 325), the container is brought down (block 330) and a determination is made as to whether it would be helpful to run the diagnostic operations defined by the diagnostic collection script 230 on the failed container (block 335). If diagnostic operations are not required to be run on the failed container (a determination of NO at block 335), the process ends (block 390). If diagnostic operations are required to be run on the failed container (a determination of YES at block 335), a Docker volume is mounted on the operating system 150 (block 340). In the example shown in FIG. 3, the mountpoint of the Docker volume is shown as being at the location /mnt in the operating system directory structure (e.g., mountpoint:/mnt), but the particular mountpoint will depend on the particular implementation.

A Docker compose YAML file is generated with an entrypoint set to a path to the diagnostic collection script 230 (block 345). By setting the entrypoint to point to the diagnostic collection script 230, it is possible to start the container image using the diagnostic collection script 230 without starting execution of the application or other executables included in the Docker image. Since the application 200 is not started when the new container is created, the log files of the original (now failed) container are unaffected and remain available on the docker volume 220.

The container is then started (block 350) specifying both the diagnostic collection script 230 as the entrypoint (entrypoint/: script_name) and the mountpoint of the Docker volume (mountpoint:/mnt).

When the new instance of the original container is started, since the same container image is used to create the new container as was used to create the previous (now failed) container, the new instance of the container will contain the same environment (network interfaces, virtual network interfaces, block devices, Docker volumes, etc.) as the previous failed Docker container (block 355). Accordingly, the diagnostic collection script 230 can run any required diagnostics (block 360), archive the diagnostics and log data (block 365), and place all the data in the mapped mountpoint (block 370). In some embodiments, the diagnostic collection script 230 includes a set of diagnostic operations that are pre-configured to be executed in the environment. In some embodiments the diagnostic collection script also includes a user interface that enables additional or alternative diagnostic collection operations to be specified. By including a user interface, the user can interactively direct operation of the diagnostics collection script 230, such that the diagnostics collected by the diagnostic collection script 230 may additionally depend on user input. For example, in some embodiments the user is able to specify to the diagnostic collection script 230 additional or alternative diagnostic operations that the diagnostic collection script should implement within the environment created in the new instance of the original container.

Once the diagnostic data and log data has been placed in the mapped mountpoint, and the archive of data is determined to be available at the masked mountpoint (block 375), the container exits (block 380). The archive of data is then able to be used to perform diagnostics on the application at the point in time when the container failed (block 385). By enabling collection of log data and diagnostic data from a container, after the container has failed, it is possible to obtain more insight into the types of conditions that existed at the point of failure, thus making it possible to work toward implementation of a solution to prevent future container failures.

Figure 4:
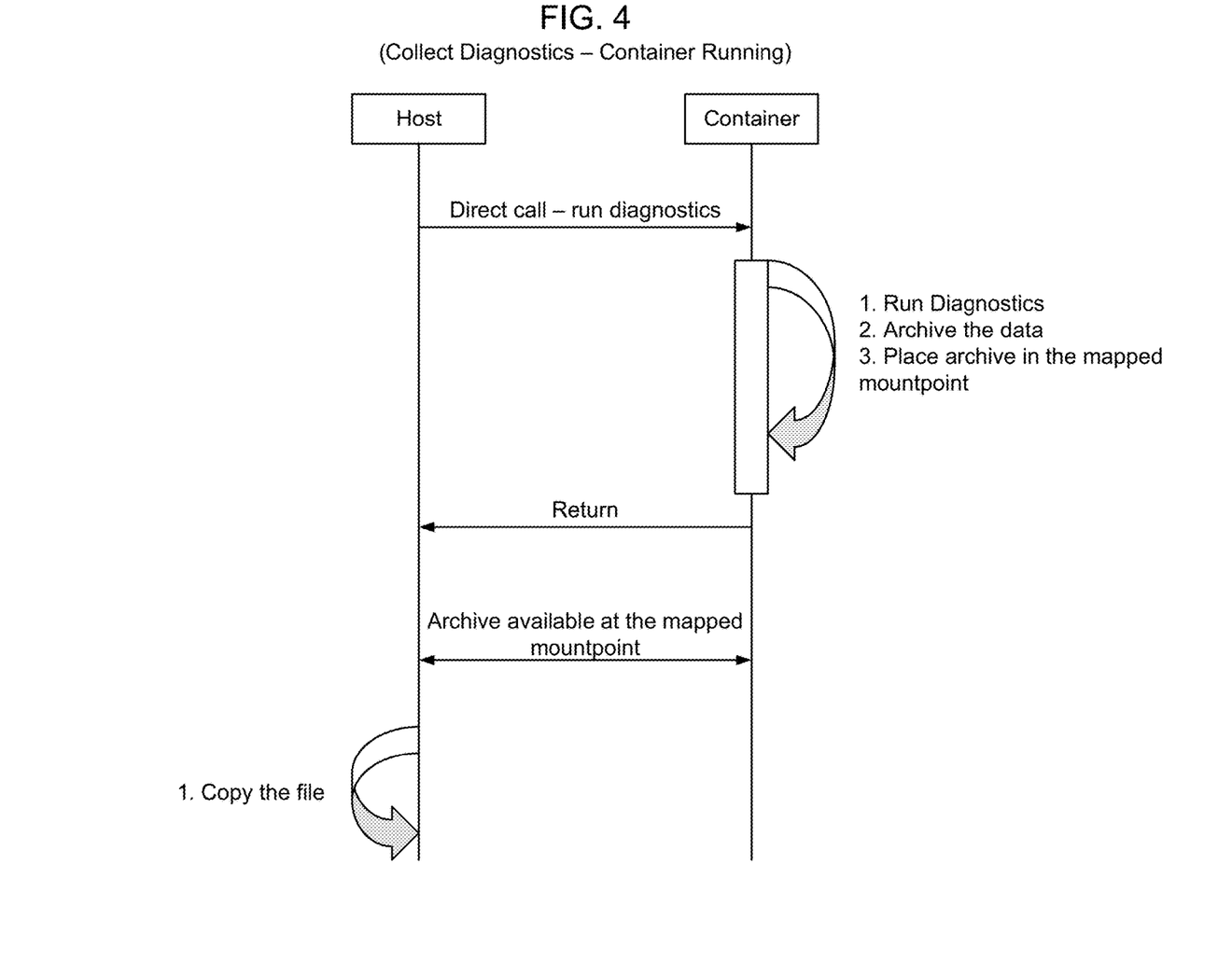
FIG. 4 is a swim lane diagram illustrating a process of collecting diagnostic information by a host from a functioning container, according to some embodiments.

FIG. 4 is a swim lane diagram illustrating a process of collecting diagnostic information by a host from a functioning container, according to some embodiments. In FIG. 4, the Docker container has been created from a Docker image.

As shown in FIG. 4, when a Docker container is executing, a direct call can be made to the Docker container to run diagnostics on the Docker container. When the call is received, the Docker container runs the requested diagnostics, archives the data, and places the archive in the mapped mountpoint. The container then sends a return message to indicate that the requested diagnostic operations have been implemented. Once the archive is available at the mapped mountpoint, the archive file is able to be copied or otherwise used to analyze the information contained in the diagnostics.

Figure 5:
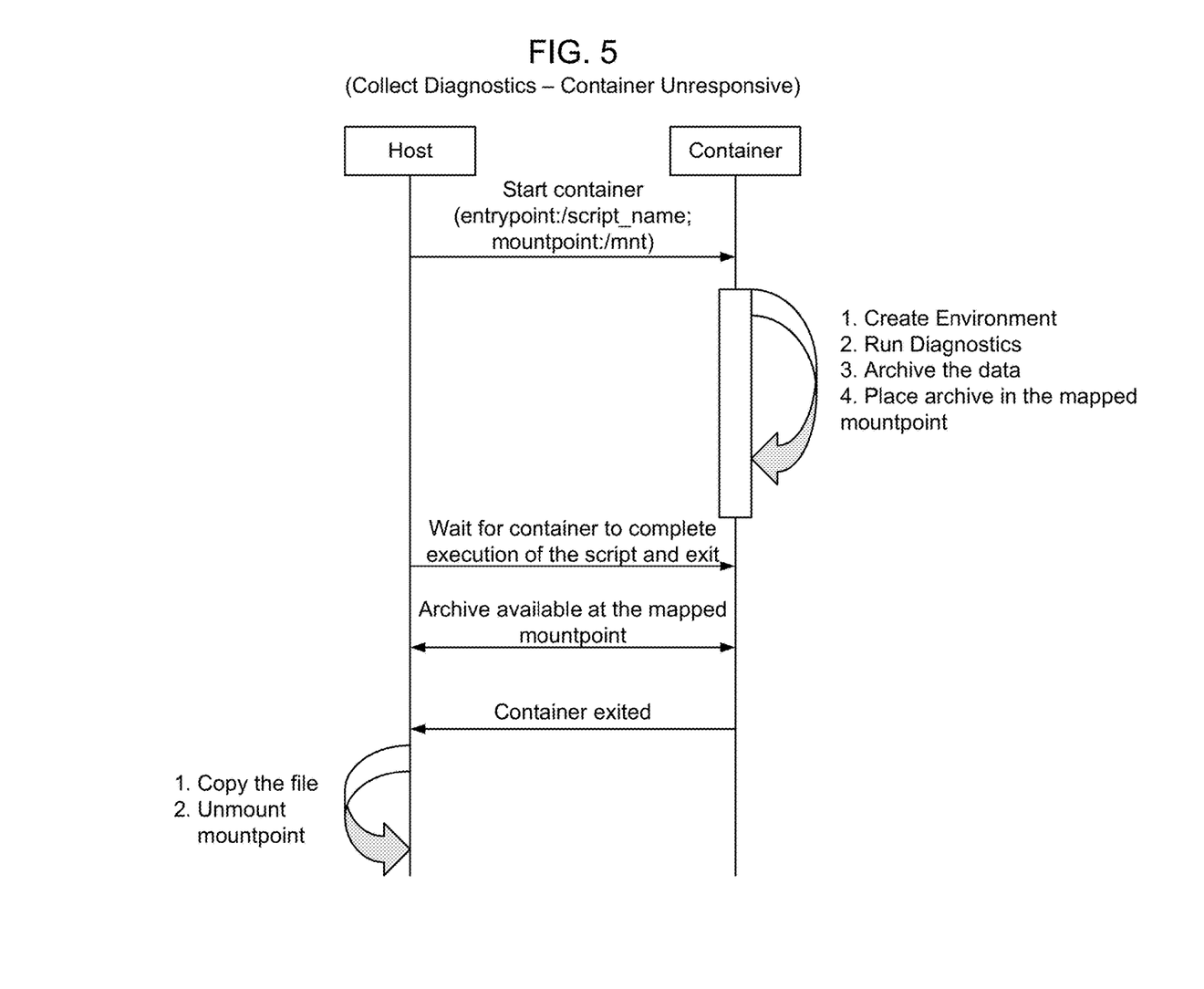
FIG. 5 is a swim lane diagram illustrating a process of collecting diagnostic information by a host from a failed container, according to some embodiments.

FIG. 5 is a swim lane diagram illustrating a process of collecting diagnostic information by a host from a failed container, according to some embodiments. As shown in FIG. 5, when a container has failed, it is not possible to obtain the log files and implement diagnostic operations on the container. Instead, a direct call is made using the same Docker image as was used to create the original (now failed) Docker container, but using the diagnostics collection script 230 as the entrypoint. By making a direct call to create a new Docker container using the same image, the new Docker container will contain the same environment and will have the same Docker volumes to therefore provide access to the log files of the previous instance of the Docker container.

Once the container has started, the diagnostics collection script 230 runs the requested diagnostics, archives the data, and places the archive in the mapped mountpoint. The process then waits for the diagnostics collection script 230 to complete execution of the script and, when execution is completed, the diagnostics collection script exits. When the script exits the container exits. Once the archive is available at the mapped mountpoint, the archive file is able to be copied or otherwise used to analyze the information contained in the diagnostics to ascertain the state of the environment and the state of the application at the point in time when the container failed.

Figure 6:
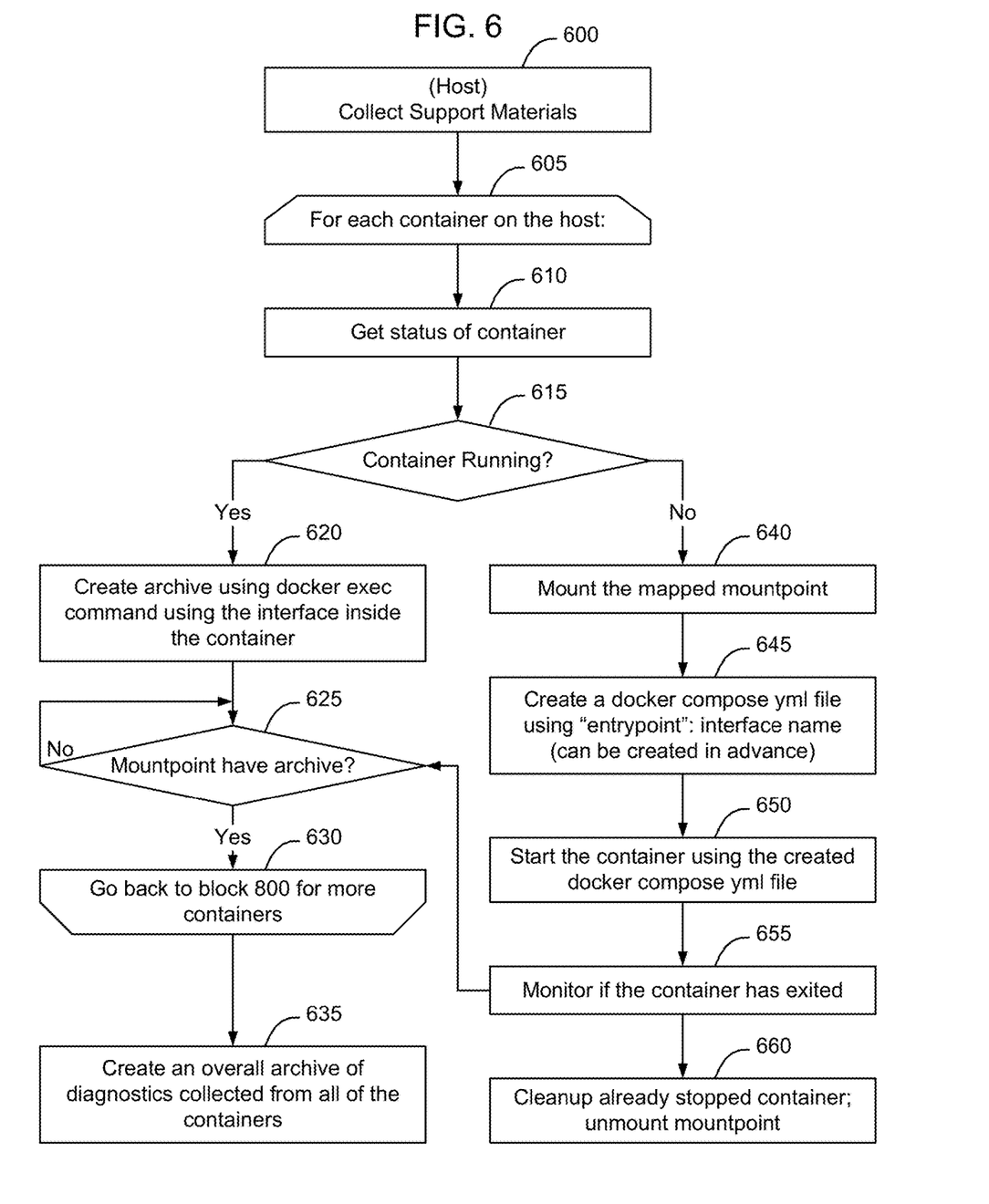
FIG. 6 is a flow chart of an example process of collecting diagnostic information from a set of containers, where some of the containers are functioning and other containers are failed, according to some embodiments.

FIG. 6 is a flow chart of an example process of collecting diagnostic information from a set of containers, where some of the containers are functioning and other containers are failed, according to some embodiments. In some instances, when a container fails, it might be advantageous to be able to collect diagnostic information and log files from multiple containers that were executing at the time of failure. Collecting diagnostic information from the container that failed, as well as the containers that were executing on the operating system at the time of failure but that didn't fail, might provide insight into the cause of the failure of the failed container.

Accordingly, as shown in FIG. 6, in some embodiments a host is instructed to collect support materials such as log files and diagnostic information from a set of containers executing on a host (block 600). In response, for each container on the host (block 605) the host determines the status of the container (block 610) and determines if the container is running (block 615).

If the container is running (a determination of YES at block 615), the host creates an archive using the "docker exec" command, which is used to run a new command in a running container. The command instructs the Docker container to run the requested diagnostics. A determination is then made if the mountpoint has the requested archive of diagnostics from the current container (block 625). If the mountpoint does not have the archive (a determination of NO at block 625) the process waits until the diagnostics complete or timeout. When the mountpoint does have the archive (a determination of YES at block 625), the process continues to collect archives of logs and diagnostics from other containers.

If the container is not running (a determination of NO at block 615), the host will mount the mapped mountpoint (block 640), create a Dcker compose .yml (YAML) file using the entrypoint to the Docker image as the interface name of the diagnostic collection script 230 (block 645), and start the Docker container using the created Docker compose .yml file (block 650). The host will then monitor if the Docker container has exited (block 655). Once the Docker container has exited, the archive of log files and diagnostics will be available at the archive (block 625). The host then cleans up the already stopped container and unmounts the mountpoint (block 660).

In some embodiments, the process shown between blocks 604 and 630 iterates for each container on host. Although FIG. 6 shows the host serially processing containers to collect logs and diagnostic information from a set of containers executing on the host, it should be understood that the host may collect logs and diagnostics from multiple containers in parallel, rather than serially as described in connection with FIG. 6. Once the host has processed all of the containers, an overall archive of diagnostic information is created from all of the containers (block 635) that may be optionally used to evaluate the conditions that existed on the host at the time of failure of one or more of the containers.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A system comprising:
   one or more processors; and
   a non-transitory tangible computer readable storage medium having stored thereon a computer program including a set of instructions which, when executed by the one or more processors, cause the one or more processors to execute a method comprising:
   creating a container image including an application and a diagnostics collection script;
   creating a first container from the container image using the application as an entrypoint to the first container, the first container including a first container environment;
   starting the first container;
   after the first container has failed:
   creating a second container from the container image using the diagnostics script as an entrypoint to the second container without starting execution of the application, the second container including a second container environment that is the same as the first container environment;
   collecting log files of the first container by the diagnostics collection script, wherein the log files include diagnostic information from the failed first container;
   starting the second container in a safe mode; and
   running diagnostic operations by executing the diagnostics collection script on the second container environment without interfering with the second container's original settings by creating a wrapper around diagnostic collection binaries specific to the second container.

2. The system of claim 1, wherein:
   the second container is deployed on a host operating system,
   the first container environment includes a virtual network interface to the host operating system, and
   the second container environment includes the virtual network interface to the host operating system.

3. The system of claim 2, wherein running the diagnostic operations by the diagnostics collection script on the second container environment comprises running the diagnostic operations on the virtual network interface to the host operating system.

4. The system of claim 1, wherein:
   the first container environment includes a dedicated network interface, and
   the second container environment includes the dedicated network interface.

5. The system of claim 4, wherein running the diagnostic operations by the diagnostics collection script on the second container environment comprises running the diagnostic operations on the dedicated network interface.

6. The system of claim 1, wherein:
   the first container environment comprises a virtual network interface to a host operating system, a dedicated external network interface, a dedicated block device, and a storage volume, and
   the second container environment comprises the virtual network interface to the host operating system, the dedicated external network interface, the dedicated block device, the storage volume.

7. The system of claim 6, wherein;
   the first container environment is specified by the container image, and
   the second container environment is specified by the container image.

8. The system of claim 1, wherein the system further includes a user interface to enable a user to specify the diagnostic operations to be run by the diagnostics collection script on the second container environment.

9. The system of claim 1, wherein creating the second container from the container image further comprises specifying a storage volume mounted at a mountpoint on a host operating system.

10. The system of claim 9, wherein the method further comprises:
storing the log files of the first container and results of the diagnostic operations in the storage volume at the mountpoint.

11. A method comprising:
creating a container image including an application and a diagnostics collection script;
creating a first container from the container image using the application as an entrypoint to the first container, the first container including a first container environment;
starting the first container;
after the first container has failed:
creating a second container from the container image using the diagnostics collection script as an entrypoint to the second container without starting execution of the application, the second container including a second container environment that is the same as the first container environment;
collecting log files of the first container by the diagnostics collection script, wherein the log files include diagnostic information from the failed first container;
starting the second container in a safe mode; and
running diagnostic operations by executing the diagnostics collection script on the second container environment without interfering with the second container's original settings by creating a wrapper around diagnostic collection binaries specific to the second container.

12. The method of claim 11, wherein:
the second container is deployed on a host operating system,
the first container environment includes a virtual network interface to the host operating system, and
the second container environment includes the virtual network interface to the host operating system.

13. The method of claim 12, wherein running the diagnostic operations by the diagnostics collection script on the second container environment comprises running the diagnostic operations on the virtual network interface to the host operating system.

14. The method of claim 11, wherein:
the first container environment includes a dedicated network interface, and
the second container environment includes the dedicated network interface.

15. The method of claim 14, wherein running the diagnostic operations by the diagnostics collection script on the second container environment comprises running the diagnostic operations on the dedicated network interface.

16. The method of claim 11, wherein:
the first container environment comprises a virtual network interface to a host operating system, a dedicated external network interface, a dedicated block device, and a storage volume, and
the second container environment comprises the virtual network interface to the host operating system, the dedicated external network interface, the dedicated block device, the storage volume.

17. The method of claim 16, wherein:
the first container environment is specified by the container image, and
the second container environment is specified by the container image.

18. The method of claim 11, further comprising:
enabling, by a user interface, a user to specify the diagnostic operations to be run by the diagnostics collection script on the second container environment.

19. The method of claim 11, wherein creating the second container from the container image further comprises specifying a storage volume mounted at a mountpoint on a host operating system.

20. The method of claim 19, further comprising:
storing the log files of the first container and results of the diagnostic operations in the storage volume at the mountpoint.

* * * * *